United States Patent [19]

Dorsey

[11] 4,412,800

[45] * Nov. 1, 1983

[54] MOLD ASSEMBLY FOR COMPRESSING REFRACTORY MATERIAL AND INCLUDING A QUICK CHANGE MOLD BOX

[76] Inventor: Robert J. Dorsey, 8554 S. Kenneth Ave., Chicago, Ill. 60652

[ * ] Notice: The portion of the term of this patent subsequent to Jan. 12, 2000, has been disclaimed.

[21] Appl. No.: 241,769

[22] Filed: Mar. 9, 1981

Related U.S. Application Data

[62] Division of Ser. No. 965,794, Dec. 4, 1978, Pat. No. 4,265,610.

[51] Int. Cl.[3] .......... B28B 3/08; B29C 3/00

[52] U.S. Cl. .......... 425/195; 425/411; 425/415; 425/423

[58] Field of Search .......... 425/195, 411, 423, 415

[56] References Cited

U.S. PATENT DOCUMENTS

| | | | |
|---|---|---|---|
| 3,153,833 | 10/1964 | Jackson | 425/415 X |
| 3,161,937 | 12/1964 | Gjertsen | 425/415 |
| 3,447,205 | 6/1969 | Dorsey | 425/195 |
| 4,050,865 | 9/1977 | Drostholm et al. | 425/195 X |

*Primary Examiner*—Philip E. Anderson

[57] ABSTRACT

A press is disclosed for use in compressing refractory material in the manufacture of bricks and the like, the press including means for supporting a mold box in the press in such a manner that the mold box is easily and quickly removed from a supporting mold table, and wherein the hydraulic clamping apparatus of the press can also be used to provide the motive force for separating the mold box from the supporting mold table.

26 Claims, 5 Drawing Figures

MOLD ASSEMBLY FOR COMPRESSING REFRACTORY MATERIAL AND INCLUDING A QUICK CHANGE MOLD BOX

This application is a division, of application Ser. No. 965,794, filed Dec. 4, 1978 now U.S. Pat. No. 4,265,610 issued May 5, 1981.

BACKGROUND OF THE INVENTION

The invention relates to presses for use in compressing refractory material in a mold in the manufacture of bricks and the like, and moe particularly to a mold structure assembly which facilitates insertion and removal of the mold box of the assembly, and to a method for inserting and removing the mold box from the mold assembly.

A mold press box assembly is shown, for purposes of illustration and example in the U.S. Dorsey Pat. No. 3,447,205, issued June 3, 1969, and assigned to the assignee of the present invention. In presses of the type referred to in the Dorsey patent, the press includes a mold box commonly having a plurality of mold cavities therein for receiving refractory material and wherein the refractory material can be compressed between a pair of plungers in the formation of bricks and other like products. In conventional refractory brick presses, substantial forces are required to compress the material in the molds. Accordingly, the mold box and the surrounding ring must be heavy to provide the requisite strength, and the mold box must be rigidly mounted in the press apparatus. The high compressive forces and forming pressures achieved in the mold tend to create deflections or deformation of various portions of the mold box. In order to counter-act such deflections, the mold box shown in the Dorsey patent is supported in a large cavity in a supporting ring, the supporting ring surrounding the mold box and functioning to prevent outward deflection of the walls of the mold box.

While the mold supporting structure shown in the Dorsey patent is desirable because it prevents deformation of the mold box, it is further desirable that the mold box be readily removable from the press to thereby facilitate substitution of an alternate mold box whereby alternative products can be produced in the press.

SUMMARY OF THE INVENTION

It is an object of the invention to provide a press for refractory material wherein the mold box is both supported such that the mold walls are not subject to deflection or deformation and such that the mold box is easily removable from the press to thereby permit substitution of an alternative mold box in the press.

It is a feature of the invention to accomplish these objects by providing a mold assembly for use in presses and including a mold table having a central aperture, the boundary of the aperture being defined by a plurality of discrete portions, each of the portions sloping downwardly end outwardly. The mold assembly also includes a mold box positionable in the central aperture, the mold box including at least one mold cavity therein, means for supporting the mold box and the mold table for relative movement between a position wherein the mold box and the mold table are in spaced apart relation to a position wherein the mold box is positioned in the aperture. A plurality of wedges are also provided within the aperture and surrounding the mold box, the wedges being positioned circumferentially around the aperture for releasably securing the mold box in the aperture. Means are further provided for forcing at least one of the wedges into clamping engagement with the mold box as the mold box is moved into the aperture.

It is another feature of the invention to provide a mold assembly for use in presses and including a mold table having a central aperture, the boundary of which is defined by a plurality of discrete portions, the portions sloping downwardly and outwardly, and a mold box located in the aperture and defining at least one mold cavity. The mold assembly also includes a plurality of wedges within the aperture and surrounding the mold box and positioned circumferentially around the aperture, the wedges including a first wedge having a first surface formed to mate against one wall of the mold box, means for restraining the first wedge against that one portion for slidable movement thereagainst and for forcing the first wedge between that one portion and the mold box. The restraining means includes a member positionable adjacent at least a portion of the wedge and means for forcing the member against the wedge. The mold assembly also includes a second wedge transverse to the first wedge and having a first surface formed to mate with another of the portions and a second surface formed to mate against another wall of the mold and transverse to the one wall, and means for retraining the second wedge.

Another feature of the invention is the provision of means for supporting the mold box and the mold table for relative movement between a position wherein the mold box and the mold table are in spaced relation to a position wherein the mold box is positioned in the aperture, and means for forcing the second wedge into clamping engagement with the mold box as the mold box is moved into the aperture.

It is another feature of the invention to provide a press for molding refractory material and including a bed, a plunger assembly supported by the bed and including one upwardly projecting plunger, a mold table supported for movement toward and away from the press bed and including a central aperture, and a mold box supportable in the central aperture. The mold box includes at least one mold cavity for receiving the plunger. The mold box and the central aperture of the mold table form at least two downwardly diverging cavities therebetween. Means are further provided for releasably restraining the mold box in said central aperture, the restraining means including wedges positionable in the downwardly diverging cavities for clampingly engaging the mold box in response to movement of the mold table with respect to the mold box until the mold box is housed in the central aperture, and movable away from the mold box to release the mold box in response to upward movement of the mold table with respect to the mold box. The press further includes means for selectively restraining the mold box from upward movement, and means for causing upward movement of the mold table with respect to the mold box.

Various other features and advantages of the invention are set forth in the following specification, in the drawings and in the claims.

Figure 1:
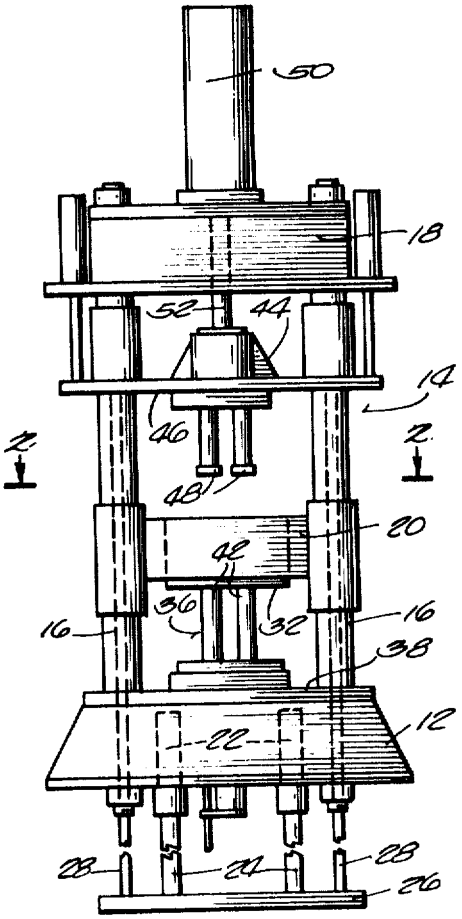
FIG. 1 is an elevation view of a press embodying the present invention.

Before explaining the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

Illustrated in FIG. 1 is a press 10 for use in compressing refractory material and for forming bricks and other similar products formed by compressing the refractory material under high compressive loads in a mold. The press 10 generally includes a bed 12 functioning as a rigid supporting structure, and a rigid frame assembly 14 supported by the bed 12. The frame assembly 14 is comprised of four spaced apart parallel cylindrical support columns or tie rods 16 and an upper frame member or yoke 18 supported in spaced relation from the bed 12 by the columns 16. The press 10 further includes a mold table 20 which is positioned above the bed 12 and which is slideably supported on the cylindrical columns 16 for movement toward and away from the bed 12.

Means are also provided for causing vertical movement of the mold table 20 toward and away from the bed. While various arrangements can be provided, in the illustrated construction, the means for causing vertical movement of the mold table 20 includes a pair of hydraulic cylinders 22 secured to the bed 12 and housing downwardly extending, vertically moveable pistons 24. The pistons 24 are connected at their lower ends to a yoke 26. Spced parallel tie rods 28 are fixedly attached to their lower ends to respective opposite ends of the yoke 26. The tie rods 28 extend upwardly through bores in the bed 12 and are connected at their upper ends to the mold table 20. Actuation of the cylinders 22 causes vertical movement of the yoke 26, such movement being translated through the tie rods 28 to the mold table 20.

As will be described more fully hereinafter, the mold table 20 also includes a central aperture 30 housing a removeable mold box 32. The mold box 32 includes a plurality of vertical mold cavities (not shown) therein, each of the mold cavities being intended to receive refractory material therein and the mold cavities providing forming surfaces.

The press 10 also includes a plunger assembly 36 supported by the upper surface 38 of the press bed 12. The plunger assembly 36 includes a plurality of upwardly extending plungers 42 adapted to be received in the mold cavities, the upper surfaces of the plungers 42 forming die plates for supporting refractory material in the mold cavities.

The press 10 further includes a crosshead 44 positioned between the mold table 20 and the yoke 18, the crosshead 44 being supported for slideable movement on the columns 16 for movement toward and away from the mold table 20. The crosshead 44 includes a planar lower surface 46 supporting a plurality of downwardly extending plungers 48 complementary to the plungers 42 of the lower plunger assembly 36. The plungers 48 are adapted to be received in the upwardly opening mold cavities of the mold box 32 whereby refractory material can be compressed in the mold cavities between the plungers 48 and the plungers 42.

To provide for such compression of the refractory material in the mold cavities, means are provided for forcing the crosshead 44 and the plungers 48 downwardly. While various arrangements can be provided, in the illustrated construction, the means for forcing the crosshead 44 downwardly includes an hydraulic cylinder 50 supported by the yoke 18 and having an hydraulic piston 52 including a free end attached to the crosshead 44 and for applying a downward motive and compressive force on the crosshead 44. It will be appreciated by one skilled in the art that a plurality of alternative means could similarly be employed to apply a downward force on the crosshead 44. Such alternative means could include a screw mechanism, a conventional toggle mechanism, or a combination of either the screw or the toggle mechanism with the hydraulic clamping device.

In operation of the press 10 during production of compressed refractory articles such as bricks and the like, the mold table 20 is positioned by actuation of the hydraulic cylinders 22 such that the plungers 42 of the lower plunger assembly 36 extend upwardly into the mold cavities of the mold box 32. The crosshead 44 is elevated by actuation of the hydraulic cylinder 50 to a position wherein the plungers 48 are spaced above the mold box 32 to permit refractory material to be placed in the mold cavities 34. The crosshead 44 is then forced downwardly by the piston 52 such that the plungers 48 enter the mold cavities 34 and suitably compress the refractory material therein. The crosshead 44 is then moved upwardly to retract the plungers 48. The hydraulic cylinders 22 are then actuated to cause the mold table 20 to move downwardly with respect to the plungers 42 whereby the plungers 42 force the molded products upwardly out of the mold cavities 34 so that they can be removed.

Means are further provided for adjusting the amount of downward travel of the mold table and for adjusting the position of the mold table when it is in its lowest position. While various arrangements can be provided, in the illustrated construction, the upwardly extending tie rods 28 are surrounded by hollow cylindrical stands 29 (FIGS. 3 and 4) the stands 29 each having a lower end supported by the upper surface of the bed 12. The upper end of each stand extends through a bore 31 in the mold table into a rectangular cavity 33. The upper ends 35 of each of the tie rods 28 are threaded and extend through the rectangular cavities 33 and project upwardly from the mold table through a bore 37. The upper end 35 of the tie rods 28 can threadably receive a nut 39 thereon, the nut 39 being intended to clamplingly engage the upper surface of the mold table 20. The threaded upper end 35 of the tie rod 28 also supports a lock washer 41 and an adjusting nut 43, the lock washer 41 and adjusting nut 43 being housed in the rectangular cavity 33 and engaging its upper wall.

Means are also provided for restraining the adjusting nut 43 against movement. The restraining means includes a cylindrical roller 45 (FIG. 2) receivable in semi-cylindrical notches 47 circumferentially located around the periphery of the adjusting nut 43. The roller 45 is supported for movement toward and away from the adjusting nut 43 by a bracket 49, the bracket being pivotally joined at one of its ends to the mold table 20 by a pivot pin 51 and having a projecting lever 53 connected to its other end. A tension spring 55 is connected at one end to the mold table and at an opposite end to the lever 53 to bias the free end of the bracket 49 and the roller 45 toward the adjusting nut 43.

In operation, if it is desired to adjust the relative position of the upper ends of the plungers 42 with respect to the mold table 20 and the mold box 32 such that during ejection of the compressed product from the mold cavities the plungers will push the mold product completely out of the mold cavities, the adjusting nut 43 can be loosened to thereby permit adjustment of the position of the nuts 43 and 39 on the tie rods 28 and consequently adjustment of the relative vertical position of the mold table 20.

One of the principal advantages of the construction of the press 10 and more particularly, of the mold table 20, is that the mold box 32 can be conveniently removed from the mold table 20 and an alternative mold box 32 substituted with a minimum of labor and without removing the entire mold table 20 from the press 10. Additionally, even though the mold box is easily removable, it is supported in the mold table 20 in a manner such that the sidewalls of the mold box 32 are rigidly supported against outward deflection during the pressing operation. As described in the U.S. Dorsey patent referred to above, the high compressive forces applied to the refractory material in the mold cavities tend to cause distortion or outward deflection of the walls of the mold box. When compressive force on the refractory material is removed, the walls of the mold box tend to return to their original position thereby squeezing the bricks formed therein. As a result, the bricks may be difficult to remove from the mold cavity and may "pop" out of the mold. Damage to the corners or edges of the bricks may result. By rigidly supporting the mold walls to prevent their deflection or distortion during compression of the refractory material in the mold cavities, such damage to the bricks would be avoided.

Another of the advantages of the invention as embodied in the construction of the press 10, is that it facilitates employment of the hydraulic apparatus of the press to separate the mold box from the mold table during substitution of the mold boxes.

To accomplish the advantages set forth above, the mold table 20 is comprised of a mold box supporting ring 54 (FIG. 2) supported for slideable movement on the columns 16 by a plurality of sleeves 56, the sleeves 56 being integrally joined to the periphery of the ring 54. The ring 54 includes a central generally circular aperture 58 therein intended to house the generally rectangular mold box 32. The central aperture 58 is defined by a pair of opposed planar upwardly and inwardly converging planar end walls 60 and 62 and by a pair of opposed side wall surfaces 64 and 66, the side wall surfaces extending between the end walls 60 and 62 and each being a portion of one of two cylinders having intersecting longitudinal axes. In the illustrated embodiment, the partial cylindrical surfaces 64 and 66 have identical diameters and converge upwardly.

Means are further provided for releasably wedging the mold box 32 in the aperture 58 of the ring 54. The wedging means includes a first pair of spaced apart wedges 68 (best shown in FIG. 3). The wedges 68 are positionable in clamping engagement against the opposite end walls 72 and 74 of the mold box 32. The wedging means also includes a second pair of wedges 76 and 78 positionable in clamping engagement against the planar vertical side walls 80 and 82 respectively of the mold box 32. The wedges 68 each include a first surface 84 (FIG. 3) defining a planar vertical face and adapted to be positioned against and engage the end walls 72 and 74, respectively, of the mold box 32, and a second surface 86 that is adapted to mate with one of the upwardly extending inwardly sloping end walls 60 and 62, respectively. The wedges 76 and 78 each include a first surface 88 (FIG. 4) defining a planar vertical face that is adapted to be positioned against and engage the side walls 80 and 82, respectively, of the mold box 32, and a seconc curved surface 90 that is adapted to mate with one of the walls 64 and 66, respectively of the aperture 58. As further shown in FIG. 4, to provide means for maintaining alignment of the wedges 76 and 78 with respect to the sidewalls 64 and 66, respectively, a pair of T-shaped guides 92 are bolted to the respective surfaces of the sidewalls 66 and 64 and are housed within complementary T-shaped grooves 94 (FIG. 2) in the surfaces 90 of the wedges 76 and 78.

Figure 3:
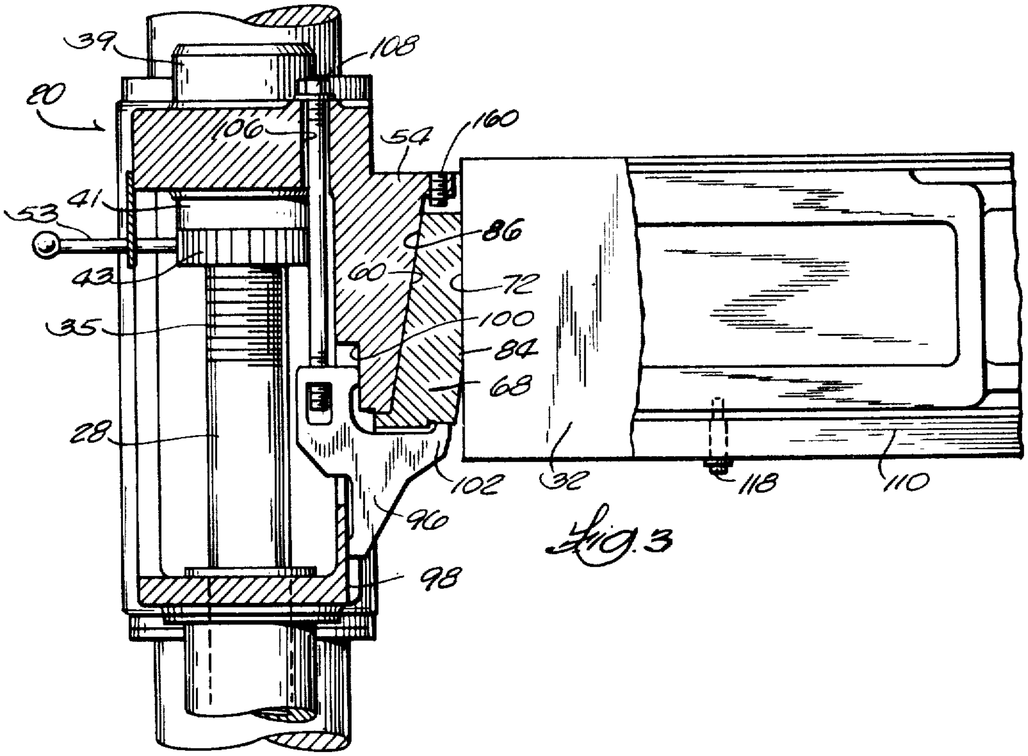
FIG. 3 is a cross section view taken generally along the line 3—3 in FIG. 2.

Means are also provided for forcing the wedges 68 upwardly with respect to the upwardly and inwardly sloping surfaces 60 and 62, respectively, to thereby cause the planar vertical faces 84 of the wedges 68 to firmly engage the end walls 72 and 74 of the mold box 32. In the illustrated construction, this means includes vertically slideable yokes 96 (FIG. 3) positioned beneath the respective wedges 68 and means for causing upward movement of the yokes 96 with respect to the ring 54. The yokes 96 are supported for slideable movement against the vertical faces 98 and 100 of the ring 54 and include a rigid projection 102 which extends beneath the wedges 68 to engage their lower surfaces. The means for causing vertical movement of the wedges 68 also includes a vertical rod 104 having an upper end which extends through a bore 106 in the ring 54 and threadably supports a nut 108 thereon. As illustrated in FIG. 3, tightening of the nut 108 will cause the rod 104 to be pulled upwardly with respect to the ring 54 whereby the wedge 68 is forced upwardly by the yoke 96 and whereby the upwardly and inwardly converging wall 60 causes the surface 84 of the wedge 68 to clampingly engage the end wall of the mold box 32.

Figure 4:
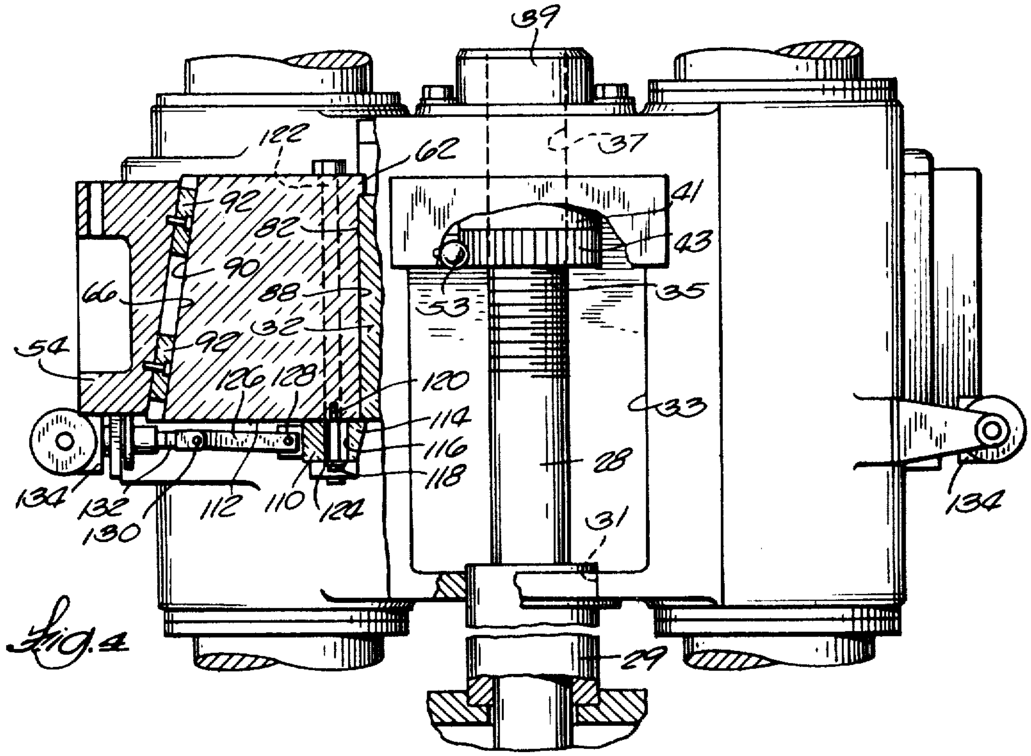
FIG. 4 is a cross section view taken generally along line 4—4 in FIG. 2.

Means are also provided for maintaining the wedges 76 and 78 in clamping engagement against the side walls of the mold box 32. Referring to FIGS. 3 and 4, such means are shown as including an elongated slideable bar 110 extending along the length of the mold box 32 and slideably supported against the lower surface 112 of the wedge 78, the slideable bar 110 being moveable such that a lip 114 of the slideable bar is positionable against the lower edge of one of the sides of the mold box 32. The slideable bar 110 includes a plurality of longitudinally spaced slots 116 cut therein, the slots 116 extending transversely to the longitudinal axis of the bar 110. Pins 118 are received through each of the slots 116 and include a threaded end 120 received in a threaded bore in the lower surface of the wedge 76 or 78. The pins 118 include a flange at their lower end for supporting the lower surface of the bar 110. The slidable bars 110 are also supported by bolts 122 (FIGS. 2 and 4) which extend downwardly through bores in the mold table ring 54, the bolts 122 having a lower end received in a slot (not shown) in the bars 110 these slots being parallel to slots 116. A nut 124 is threaded onto the lower ends of the bolts 122 and can be tightened to clamp the bar 110 against the lower surfaces 112 of the wedges.

Figure 5:
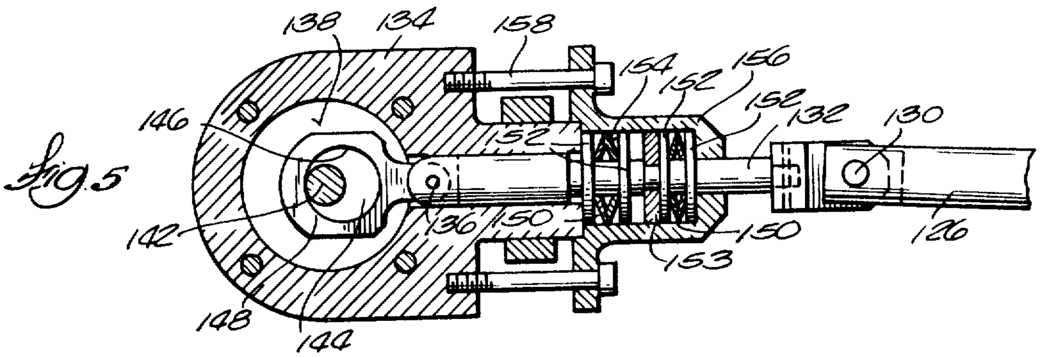
FIG. 5 is a cross section view taken generally along line 5—5 in FIG. 2.
Figure 2:
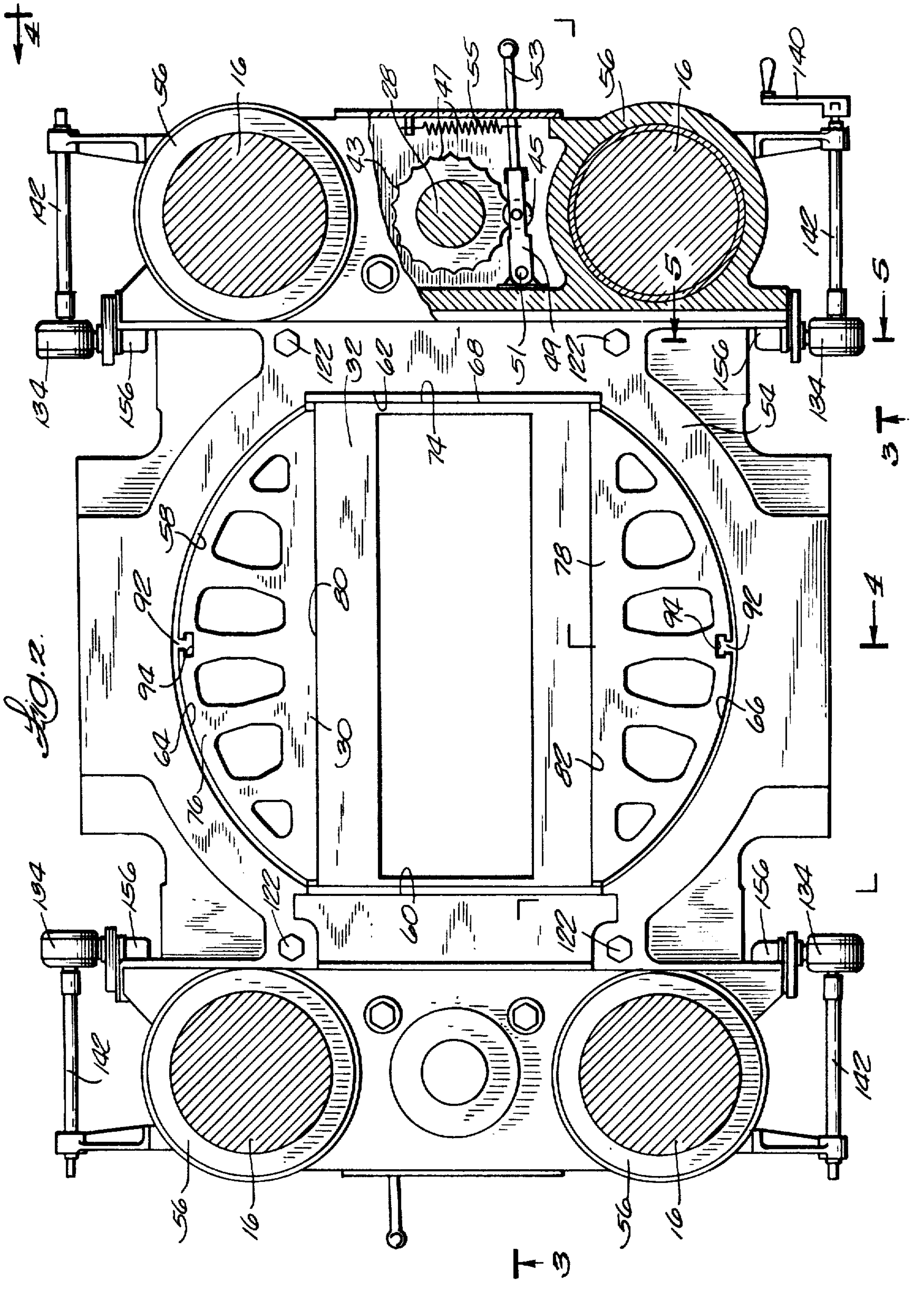
FIG. 2 is a cross section view taken along the line 2—2 in FIG. 1.

Means are also provided, upon loosening of the nuts 124 on the ends of the bolts 122, to cause movement of the bars 110 toward and away from the mold box 32. Such means is best illustrated in FIGS. 2, 4, and 5. As shown in FIG. 4, links 126 are pivotally attached by pins 128 to the opposite ends of the slideable bars 110. Each of the links 126 is connected at its opposite end by a pin 130 to a translationally moveable shaft 132 (FIG. 5). The opposite end of the shaft 132 extends into a housing 134 and is attached by pin 136 to a cam assembly 138. The cam assembly provides means for causing translational movement of the shaft 132 and the link 126 to thereby cause movement of the bar 110 toward and away from the mold box 32. The cam assembly 138 includes a crank 140 (FIG. 2) attached to the end of a rotatable shaft 142. A circular eccentric cam 144 is rigidly attached to the end of the shaft 142 for rotation therewith and is housed within a circular bore 146 in a cam follower 148. The cam follower 148 is attached by the pin 136 to the shaft 132. As will be seen by reference to FIG. 5, rotation of the crank 140 and the shaft 142 results in rotational movement of the circular cam 144 within the circular bore 148 in the cam follower 148 thereby causing translational movement of the cam follower 148 and the shaft 132. Means are also provided for biasing the shaft 132 against translational movement. Such means include two pairs of Belleville washers 150 surrounding the shaft 132 and each engaged between washers 152 supported for longitudinally slideable movement on the shaft 132. A washer 153 is fixed to the shaft 132 for movement therewith. Movement of the washer 153 and the shaft 132 is resiliently resisted when the washer 153 contacts either of the washers 152 adjacent the Belleville washers 150. The Belleville washers 150 and washers 152 and 153 are housed within a cylindrical bore 154 in a housing 156 attached by bolts 158 to the end of the housing 134.

In operation of the press 10, mold box 32 is conveniently removed from the mold table 20 by first lowering the mold table 20 until the mold box 32 rests on the lower plunger assembly 36 and is supported by the bed 12. A rectangular metal plate (not shown) is then placed on the upper planar surface of the mold box 32. The metal plate should be of such a size as to cover the mold box but should not extend beyond the peripheral edge of the mold box. The crosshead 44 is then lowered until the plungers 48 are positioned on the metal plate and will thereby restrain the mold box 32 from upward movement. The nuts 108 on the end of the threaded rods 104 are then loosened to permit downward movement of the yokes 96 and consequent downward movement of the wedges 68. If the wedges 68 fail to move downwardly with the yokes 96, jackscrews 160 (FIG. 3), extending through threaded bore in the mold table ring 54, can be forced against the upper surface of the wedges 68 to push them downwardly.

The four bolts 122 securing the clamp bars 110 against the lower surfaces of the wedges 76 and 78 can then be loosened to permit slideable retraction of the support bars 110. Such retraction is affected by rotation of the crank handles 140 thereby causing rotation of the shafts 142 and consequent rotation of the cams 144 (FIG. 5). Such rotation of the eccentric cams 144 causes translational movement of the shafts 132 and links 126 in the manner described above, and thereby causes retraction of the support bars 110 away from the side walls 80 and 82 of the mold box 32, thereby permitting upward movement of the mold table ring 54 and the wedges 76 and 78 with respect to the mold box 32.

The hydraulic cylinders 22 are then actuated to cause upward movement of the mold table 20. As the mold table 20 moves upwardly, the mold ring 54 will initially move upwardly with respect to the wedges 76, and 78. Such relative upward movement of the ring 54 with respect to the wedges 76 and 78 removes the clamping force by the wedges on the mold box 32. As the mold table 20 continues to move upwardly, the bolts 122 restrict any further relative vertical movement of the ring 54 and the wedges 76 and 78, and the wedges 76 and 78 will then move upwardly with the mold table 20 and away from the mold box 32.

A new mold box 32 is substituted for that which was removed by first positioning the new mold box 32 on the lower plunger assembly with the plungers 42 of the lower plunger assembly 36 received in the mold cavities of the mold box. As the mold table is lowered the vertical planar surfaces of the respective wedges 68, 76, and 78 will be spaced slightly outwardly from the side walls of the mold box. As the mold table 20 moves to its lowermost position, the inwardly projecting rib 162 (FIG. 4) adjacent the upper edge of each of the wedges 76 and 78 will engage the upper edge of the sides 80 and 82, respectively, of the mold box. Accordingly, the wedges 76 and 78 will be restrained against further downward movement, and the resulting relative downward movement of the ring 54 with respect to the wedges 76 and 78, causes the wedges 76 and 78 to be forced inwardly against the side walls of the mold box.

When the ring 54 is in its lower most position, the clamping bars 110 can then be moved inwardly with respect to the mold box whereby the edge 114 of the clamping bars will engage the lower edge of the mold box and thereby prevent any relative movement between the mold box 32 and wedges 76 and 78. The clamping bars can be secured in place by tightening the bolts 122.

The wedges 68 adjacent the end wall 72 and 74 of the mold box 32 can then be forced into engagement with those end walls by tightening the nuts 108 on the ends of the threaded rods 104 to thereby cause upward movement of the yokes 96. Such upward movement of the yokes 96 causes upward slideable movement of the wedges 68 with respect to the upwardly and inwardly converging surfaces 60 and 62, respectively, and consequent clamping of the wedges 68 against the end walls of the mold box 32.

Various features of the invention are set forth in the following claims.

I claim:

1. A mold assembly for use in a press and comprising a mold table having a central aperture, the boundary of said aperture being defined by a plurality of discrete portions, each of said portions sloping downwardly and outwardly, a mold box positionable in said central aperture, said mold box including at least one mold cavity therein, said mold box and said mold table being adapted to be supported in the press for relative movement between a position wherein said mold box is housed in said aperture and a position wherein said mold table is removed from said aperture, and means for releasably wedging said mold box in said central aperture when said mold table and said mold box are moved with respect to each other in the press to a position wherein said mold box is housed in said central aperture, said means for releasably wedging including means for releasing said mold box when said mold table is moved in said press with respect to said mold box away from said position wherein said mold box is housed in said aperture, said means for releasably wedging including a plurality of wedges carried by said mold table within said aperture and adapted to surround said mold box, said wedges being positioned circumferentially around said aperture for releasably securing said mold box in said aperture, and means for forcing at least one of said wedges into clamping engagement with said mold box as said mold box is moved into said aperture.

2. A mold assembly as set forth in claim 1 wherein said means for forcing said one of said wedges into clamping engagement with said mold box includes a projection extending from said one of said wedges and for engaging said mold box when said mold box moves into said aperture.

3. A mold assembly as set forth in claim 1 wherein at least one of said discrete portions of said aperture comprises a portion of a cylindrical bore, and wherein one of said wedges includes a first surface to mate with at least a portion of said one of said discrete portions and a second surface mating with a surface of said mold box.

4. A mold assembly as set forth in claim 1 and further including means for forcing one of said wedges into said aperture and into clamping engagement with said mold box, said forcing means including a moveable member positionable against said one wedge and means for forcing said moveable member and said one wedge toward said aperture.

5. A mold assembly as set forth in claim 4 wherein said moveable member is supported against a surface of said mold table for slidable movement and wherein said means for forcing said member and said one wedge toward said aperture includes an elongated member extending through a bore in said mold table.

6. A mold assembly as set forth in claim 1 and further including means for selectively preventing relative movement of said mold box with respect to said one wedge when said one wedge clampingly engages said mold box, said movement preventing means including a bar positionable against a surface of said mold box and against said wedge and means for causing slidable movement from a position wherein said bar is positioned against said mold box to a position spaced from said mold box.

7. A mold assembly for use in a press and comprising:

a mold table having a central aperture, the boundary of which is defined by a plurality of discrete portions, said portions sloping downwardly and outwardly, a mold box located in said aperture and defining at least one mold cavity, said mold box and said mold table being adapted to be supported for movement in the press between a position wherein the mold box is removed from said aperture to a position wherein said mold box is positioned in said aperture, and means for releasably wedging said mold box in said central aperture when said mold table and said mold box are moved with respect to each other in the press to a position wherein said mold box is housed in said aperture, said means for releasably wedging including means for releasing said mold box from said aperture when said mold table and said mold box are moved with respect to each other in the press away from said position wherein said mold box is housed in said aperture, said means for releasably wedging including a plurality of wedges carried by said mold table within said aperture and adapted to surround said mold box, said wedges being positioned circumferentially around said aperture, and said wedges including a first wedge having a first surface formed to mate with one of said portions, and a second surface formed to mate against one wall of said mold box, means for restraining said first wedge against said one of said portions for slidable movement thereagainst, and a second wedge having a first surface formed to mate against another wall of said mold and transverse to said one wall, and means for restraining said second wedge against said another of said portions for slideable movement thereagainst.

8. A mold assembly as set forth in claim 7 and further including means for forcing said second wedge into clamping engagement with said mold box as said mold box is moved with respect to said mold table into said aperture and wherein said means for forcing said second wedge into clamping engagement with said mold box includes a projection extending from said second wedge and engageable with said mold box when said mold table and said mold box moved with respect to each other such that said mold box moves into said aperture.

9. A mold assembly as set forth in claim 8 and further including means for selectively preventing relative movement of said mold box and said second wedge when said second wedge clampingly engages said mold box, said movement preventing means including a bar positionable against a surface of said mold box and against said second wedge and means for causing slidable movement from a position wherein said bar is positioned against said mold box to a position spaced from said mold box.

10. A mold assembly as set forth in claim 7 wherein said means for restraining said first wedge includes means for forcing said first wedge between said one of said portions and said mold box, said forcing means including a member positionable against a portion of said first wedge and means for forcing said member against said first wedge, and wherein said member is supported against a surface of said mold table for slidable movement and wherein said means for forcing said member against said first wedge includes an elongated member extending through a bore in said mold table.

11. A mold assembly for use in a press for molding refractory material, said mold assembly comprising:

a mold table including a central aperture, a mold box supportable in said central aperture, said mold box including at least one mold cavity, said mold box and said central aperture of said mold table forming at least two downwardly diverging cavities therebetween, said mold table and said mold box being adapted to be supported in the press for movement with respect to each other between a position wherein said mold box is housed in said aperture and a position wherein said mold table is removed from said aperture, and means for releaseably wedging said mold box in said central aperture when said mold box is housed in said central aperture and when said mold table is forced downwardly with respect to said mold box and for selectively releasing said mold box when said mold box is restrained against upward movement and said mold table is forced upwardly with respect to said mold box, said means for releaseably wedging said mold box including at least one wedge positionable in one of said downwardly diverging cavities and clampingly engaging said mold box in response to downward movement of said mold table with respect to said mold box until said mold box is housed in said central aperture and said wedge being movable away from said mold box to release said mold box in response to upward movement of said mold table with respect to said mold box.

12. A mold assembly as set forth in claim 11 wherein said means for releaseably wedging includes means for forcing said one of said wedges into clamping engagement with said mold box when said mold table is forced downwardly with respect to said mold box to cause said mold box to be housed in said central aperture, said means for forcing including a projection extending from said one of said wedges and for engaging said mold box when said mold box moves into said aperture.

13. A mold assembly as set forth in claim 11 wherein said central aperture is defined by a plurality of discrete portions, each of said portions sloping downwardly and outwardly, at least one of said discrete portions comprising a portion of a cylindrical bore, and wherein said one of said wedges includes a first surface mating with at least a portion of said one of said discrete portions and a second surface mating with a surface of said mold box.

14. A mold assembly as set forth in claim 13, and further including a second wedge positionable in another of said cavities and means for forcing said second wedge into clamping engagement with said mold box, said forcing means including a moveable member positionable against said second wedge and means for causing movement of said moveable member whereby said second wedge clampingly engages said mold box.

15. A mold assembly as set forth in claim 14 wherein said moveable member is supported against a surface of said mold table for slidable movement and wherein said means for causing movement of said moveable member includes an elongated member extending through a bore in said mold table, said elongated member including opposite ends, one of said ends engaging said movable member.

16. A mold assembly as set forth in claim 11 wherein said means for releaseably wedging further includes means for selectively preventing relative movement of said mold box and said one wedge when said one wedge clampingly engages said mold box, said movement preventing means including a bar positionable against a surface of said mold box and against said wedge and means for causing slidable movement from a position wherein said bar is positioned against said mold box to a position spaced from said mold box.

17. A mold assembly as set forth in claim 11 and wherein said central aperture includes a boundary defined by a plurality of discrete portions, said portions sloping downwardly and outwardly, wherein said means for releaseably wedging includes a plurality of wedges, and wherein said wedges surround said mold box and are positioned circumferentially around said aperture, said wedges including a first wedge having a first surface formed to mate with one of said portions, and a second surface formed to mate against one wall of said mold box, means for restraining said first wedge against said one of said portions for slideable movement thereagainst and for forcing said first wedge between said one of said portions and said mold box, said restraining means including a member positionable beneath at least a portion of said wedge and means for forcing said member against said wedge, and a second wedge having a first surface formed to mate with another wall of said mold transverse to said one wall, and means for restraining said second wedge.

18. A mold assembly including

- a mold table adapted to be supported in a press for linear movement between a first position and second position, said mold table including a central aperture,
- a mold box adapted to be supported in said central aperture of said mold table when said mold table is moved to said second position, said mold box and said mold table central aperture defining at least two cavities therebetween when said mold box is housed in said central aperture, said cavities diverging in a first direction,
- means for wedging said mold box into said central aperture when said mold box is positioned in said central aperture and said mold table is moved in the press in said first direction with respect to said mold box and for releasing said mold box from said central aperture when said mold table is moved with respect to said mold box in a direction opposite said first direction, said means for wedging including a first wedge means positionable in one of said cavities when said mold box is positioned in said central cavity and a second wedge means positionable in another of said cavities when said mold box is positioned in said central cavity, means for releaseably securing said wedges in said cavities, means for selectively preventing movement of said mold box in said opposite direction, and means for selectively causing movement of said mold table in said opposite direction with respect to said mold box.

19. A mold assembly for use in a press for molding refractory material and comprising:

- a mold table adapted to be supported in the press for reciprocal movement, said mold table including a central aperture,
- a mold box adapted to be selectively housed in said central aperture, said mold box including at least one mold cavity, said mold box and said cnetral aperture of said mold table forming at least two downwardly diverging cavities therebetween,
- means for releaseably wedging said mold box in said central aperture when said mold box and said mold table are moved with respect to each other in the press to a position where said mold box is housed in said central aperture, said means for releaseably wedging said mold box including wedges positionable in said downwardly diverging cavities and selectively clampingly engaging said mold box, said wedges being carried by said mold table for slideable movement between a first position wherein said wedges clampingly engage said mold box and a second position, said mold table including means for supporting said wedges for movement with said mold table and for slideable movement from said first position to said second position.

20. A mold assembly as set forth in claim 19 and further including means for forcing said wedges from said second position to said first position, said means for forcing including a member supported by said mold table.

21. A mold assembly as set forth in claim 19 wherein said means for releaseably wedging includes means for forcing one of said wedges into clamping engagement with said mold box when said mold box is housed in said central aperture and when said mold table is forced downwardly with respect to said mold box, said means for forcing including a projection extending from said one of said wedges and for engaging said mold box when said mold box is positioned in said aperture.

22. A mold assembly as set forth in claim 19 wherein said central aperture is defined by a plurality of discrete portions, each of said portions sloping downwardly and outwardly, at least one of said discrete portions comprising a portion of a cylindrical bore, and wherein one of said wedges includes a first surface mating with at least a portion of said one of said discrete portions and supported for slideable movement against one of said discrete portions and a second surface mating with a surface of said mold box.

23. A mold assembly as set forth in claim 22 and wherein said means for releaseably wedging includes means for forcing a second of said wedges into clamping engagement with said mold box, said forcing means including a moveable member positionable against said second wedge and means for forcing said moveable member against said wedge whereby said wedge clampingly engages said mold box.

24. A mold assembly as set forth in claim 23 wherein said moveable member is supported against a surface of said mold table for slidable movement and wherein said means for forcing said moveable member and said wedge includes an elongated member extending through a bore in said mold table, said elongated member including opposite ends, one of said ends engaging said movable member.

25. A mold assembly as set forth in claim 19 wherein said means for releaseably wedging further includes means for selectively preventing relative movement of said mold box and at least one of said wedges when said one wedge clampingly engages said mold box, said movement preventing means including a bar positionable against a surface of said mold box and against said one wedge, and means for causing slideable movement from a position wherein said bar is positioned against said mold box to a position spaced from said mold box.

26. A mold assembly as set forth in claim 19 and wherein said central aperture includes a boundary defined by a plurality of discrete portions, said portions sloping downwardly and outwardly, and wherein said wedges surround said mold box and are positioned circumferentially around said aperture, said wedges including a first wedge having a first surface formed to mate with one of said discrete portions, and a second surface formed to mate against one wall of said mold box, means for restraining said first wedge against said one of said portions for slideable movement thereagainst and for forcing said first wedge between said one of said portions and said mold box, said restraining means including a member positionable beneath at least a portion of said wedge and means for forcing said member against said wedge, and a second wedge having a first surface formed to mate with another wall of said mold transverse to said one wall, and means for restraining said second wedge.

* * * * *